United States Patent [19]
Lubbers et al.

[11] Patent Number: 5,671,406
[45] Date of Patent: Sep. 23, 1997

[54] DATA STRUCTURE ENHANCEMENTS FOR IN-PLACE SORTING OF A SINGLY LINKED LIST

[75] Inventors: Clark E. Lubbers, Colorado Springs; Susan G. Elkington, Black Forest, both of Colo.

[73] Assignee: Digital Equipment Corporation, Maynard, Mass.

[21] Appl. No.: 544,949

[22] Filed: Oct. 18, 1995

[51] Int. Cl.⁶ .................... G06F 7/08; G06F 7/00
[52] U.S. Cl. .............. 395/607; 395/611; 395/612; 395/613; 395/614; 395/615; 395/497.01
[58] Field of Search .................... 395/607, 611, 395/612, 613, 614, 615, 497.01

[56] References Cited

U.S. PATENT DOCUMENTS

| | | | |
|---|---|---|---|
| 5,121,493 | 6/1992 | Ferguson | 395/600 |
| 5,175,857 | 12/1992 | Inoue | 395/800 |
| 5,263,160 | 11/1993 | Porter, Jr. et al. | 395/600 |
| 5,274,805 | 12/1993 | Ferguson et al. | 395/600 |
| 5,278,987 | 1/1994 | Chiang et al. | 395/800 |
| 5,303,367 | 4/1994 | Leenstra, Sr. et al. | 395/600 |
| 5,551,018 | 8/1996 | Hansen | 395/600 |
| 5,557,786 | 9/1996 | Johnson, Jr. | 395/600 |
| 5,560,006 | 9/1996 | Layden et al. | 395/600 |
| 5,577,243 | 11/1996 | Sherwood et al. | 395/607 |

OTHER PUBLICATIONS

William, Pugh, "Skip Lists, A Probabilistic Alternative to Balance Trees" Communications of the ACM, V33, N6, Jun. 1990, pp. 668–676.

Gupta, Gouind, "Sorting by Hashing and Inserting", 17th Ann. ACM Conf. Communications of the ACM, 21 Feb. 1989–23 Feb. 1989.

Kirschenhoffer, Peter, "Analysis of an Optimized Search Algorithm for Skip Lists", Theoretical Computer Science, V144, N1–2, Jun. 26, 1995, pp. 199–220.

Horowitz et al., "Fundamentals of Data Structures", Computer Science Press, 1983, pp. 106–200.

*Primary Examiner*—Thomas G. Black
*Assistant Examiner*—Jean R. Homere
*Attorney, Agent, or Firm*—Ronald C. Hudgens; Cathy L. Peterson

[57] ABSTRACT

An apparatus and method for performing a skip list insertion sort on a singly linked list of elements is provided. Each element to be sorted includes a key, an element pointer in an element pointer field and a flag bit. Also provided is an indexed array of pointer arrays. If an element is to be inserted at a node level greater than zero, a free pointer array is allocated by storing an index corresponding to the allocated pointer array in the element pointer field and setting the corresponding flag bit. If a free pointer array is not available, then the node level of the element is forced to zero. If the level of the element is either assigned as or forced to zero, the flag bit is not set and the pointer array itself occupies the element pointer field as the element pointer instead of the index. Thus, the pointer to the element pointer field will point directly to the specified pointer array location without having to index into the array of pointer arrays. The skip list insertion search part of the sorting routine for each subsequent item to be inserted then tests the flag bit when traversing the list to determine whether the pointer array is in the array of pointer arrays or the element pointer field itself.

5 Claims, 6 Drawing Sheets

```
new level = get_random_level
if (new_level > curr_level)
     curr_level = curr_level + 1
     new_level = curr_level
new_pointers = address of element -> pointer
if (new_level > 0)
     if (free pointer array)
          allocate pointer array
          element -> flag = TRUE
          new_pointers = address of pointer array
          element -> pointer = index of pointer array
     else
          new_level = 0
level = curr_level
old_pointers = address of list head pointers
do
   {
   do
      {
      next_element = old_pointers [level]
      if (next_element == NULLPTR)
           break
      if (element -> key < next_element -> key)
           break
      old pointers = address of next_element -> pointer
      if (next_element -> flag
           index = next_element -> pointer
           old_pointers = address of pointer array [index]
      } while (TRUE)
   if  (new_level >= level)
        new_pointers [level] = next_element
        old_pointers [level] = element
   } while ( - - level >= 0)
```

DATA STRUCTURE ENHANCEMENTS FOR IN-PLACE SORTING OF A SINGLY LINKED LIST

FIELD OF THE INVENTION

The present invention relates generally to sorting data elements stored in a digital computer memory, and in particular, to an improved method of sorting data elements stored in linked list data structures.

BACKGROUND OF THE INVENTION

Sorting procedures play a major part in many list-based applications. In fact, sorting is more closely related to linear lists than other kinds of data structures due to the linear nature of the ordering that sorting imposes. A sorting algorithm rearranges elements of a list so that the elements are ordered according to some comparison function. This involves comparing and moving elements. Hence, the efficiency of a sort can be evaluated in terms of the number of element comparisons and movements it performs.

Movements are dramatically reduced when a linked list is used because the element to be moved can simply be removed from its current place in the list and inserted in its new place by manipulating pointer values. Thus, subsequent elements do not have to be moved as a result. Such a sorting method is commonly referred to as "in-place" sorting.

In general, sorting can be accomplished in a number of different ways; however, some sort routines are more easily adapted to certain data structures than others. One method of sorting that is particularly well suited to sorting linked lists is the insertion sort. With this approach, the list is divided by sorted and unsorted list elements. Each element of an unsorted portion of the list is considered in turn and moved to a new position among the already sorted (i.e., ordered) elements according to the ordering scheme. Initially, a first element is considered to be sorted. The insertion sort uses a comparison function which continues to search as long as the element being inserted (unsorted test element) is greater than or equal to the element being examined (sorted element). The elements are compared based on their assigned key values. This insertion search is repeated until all of the elements have been inserted in the sorted list. The insertion sort is relatively slow, however, in that already sorted elements or nodes must be searched one item at a time prior to the insertion of each test element.

Skip lists, a variant of linked linear lists, can be employed to boost performance in situations which require the frequent insertion of keyed items in an ordered search structure. Essentially, a skip list is an ordered, linked linear list of list elements, or nodes, in which some nodes contain extra pointers that skip intermediate nodes, thus increasing the speed of searches. A node with i extra forward pointers is known as a level i node. The pointers of a level i node are indexed from 0 to i; the pointer at index i in the node points to the next node of level i or greater in the list, according to the ordering scheme of the list. Thus, the pointer at index 0 of a node always points to the next node, but the pointer at index 2 of a node will point to the next node of level 2 or higher. The level of a node, from 0 to some maximum M, which is a property of the skip list, is assigned when it is inserted into the skip list. A random number generator is used, causing the probability of a node being at level L or higher to be $1/(b^L)$, where base b is a property of the skip list and chosen by the implementer. Skip lists and related algorithms are presented and discussed at some length in a paper by William Pugh, entitled "Skip Lists: A Probabilistic Alternative to Balanced Trees", Communications of the ACM. June 1990, pp. 668–676.

Like other linked list data structures, skip lists generally begin with a "list head" which points to the first node in the list. In the case of skip lists, however, the list head has M pointers, indexed in the same way as for any node in the skip list.

Skip lists have the following properties: search time proportional to log(#entries); insertion time proportional to log(#entries); delete time proportional to log(#entries); and extremely simple code—approximately ¼ the size of an AVL tree implementation. Each entry of a search structure needs room for a maximum of M pointers; the best performance will be obtained when M>=log[base b] (maximum number of entries in the list). In memory-constrained applications, however, pointer storage allocation in each node of the sorted list is a problem. Space can be conserved by using fewer pointers, but space savings cannot be achieved in this manner without sacrificing some of the performance benefits of the skip list.

Therefore, there exists in the art a clearly felt need for a sorting method and apparatus which improves the efficiency of list-based sorting operations, but requires only a moderate amount of working space or memory. This need is met by the present invention in the manner described below.

SUMMARY OF THE INVENTION

Accordingly, it is an object of the present invention to devise a method and apparatus for improving the efficiency of insertion sort operations performed on linked list data structures.

It is a further object of the present invention to minimize the memory resources involved in executing insertion sort operations on linked list data structures.

In a broad sense, the above and other objectives are attained by a system and method for performing skip list insertion sorting. The system comprises a system agent and data structure stored in memory, the data structure including an unsorted singly linked list of elements and each of the elements having a key assigned prior to an insertion sort operation. Also included is an array of pointer arrays, wherein each pointer array of the array of pointer arrays has an associated index, and a flag corresponding to each element. The flag, which is initialized to zero, is set if the corresponding element has a level greater than zero. The system further includes a list head having a maximum allowable number of levels and a pointer at each of the levels. Each pointer initially points to a null value prior to the insertion sort operation and subsequently points to a first one of the elements to be inserted at a level equal to that pointer level during the insertion sort operation. Additionally, an array of element pointer fields is provided. Each element pointer field in the array corresponds to a separate element and stores an element pointer, the element pointer providing one of the indices when the flag is set, indicating a level greater than zero. When the flag is not set, the element pointer is a pointer array. The system agent performs the skip list insertion sorting operation on the unsorted singly linked list, checking the flag bit during linking to determine whether the pointer array for the element is in the array of pointer arrays if set or in the element pointer field if not set.

The present invention thus offers the advantages of sorting efficiency and flexible use of memory space. The in-place sort of a singly linked list benefits from the execution speed of skip lists during insertion searches, but without the cost of additional, dedicated memory space for storing extra pointers in each element structure.

BRIEF DESCRIPTION OF THE DRAWINGS

The above objects, features and advantages of the present invention will become more apparent from the following detailed description taken in conjunction with the accompanying drawings, in which:

FIG. 6 is a pseudo-code implementation of the procedure depicted in the flowcharts of FIGS. 4 and 5.

DESCRIPTION OF THE PREFERRED EMBODIMENT

Figure 1:
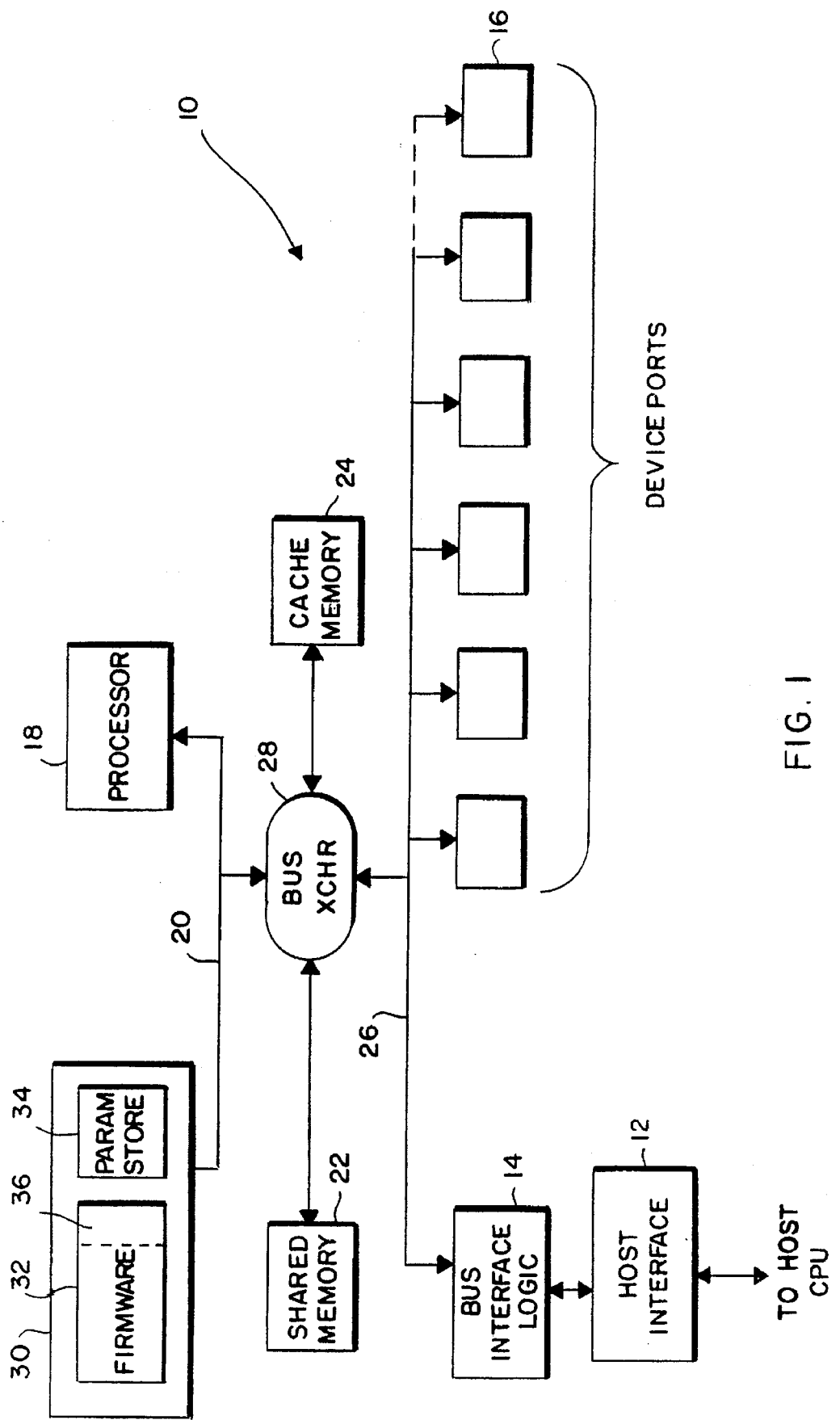
FIG. 1 is a general block diagram of a storage controller in a digital computer system utilizing the present invention.

An example of a digital computer system environment which utilizes the present invention is a storage controller 10, as illustrated in FIG. 1. Referring to FIG. 1, the storage controller 10 bridges a host interface 12 via a bus interface logic block 14 to one or more device ports 16, which provide an access path to primary storage media (not shown). The controller 10 further includes a processor 18, residing on a native bus 20. Also included are a shared memory 22, which includes buffer memory and control functions, and a cache memory 24. Separate buses containing the shared memory 22 and cache memory 24 are interconnected to the native bus 20 and a bus 26 used to access the host interface through the bus interface logic block 14 and device ports 16 by way of a bus exchanger 28. The bus exchanger is a crossbar which provides fast access by all entities to all parts of the controller. In addition to providing required bus interface logic, the bus interface logic block 14 may also include and thus represents other functional components typically needed to perform low level device and host port operations support.

Sharing the native bus 20 used by the processor is a nonvolatile memory 30. The nonvolatile memory 30 stores the controller firmware 32 and parameter data 34, and is read each time the controller boots. Included as a subcomponent of the firmware is the caching firmware, shown simply as a system agent 36. Although the firmware is contained in the nonvolatile memory 30, it is copied to the shared memory 22 at initialization for subsequent execution. Stored in the shared memory 22 are certain caching data structures, which are created and maintained by the system agent 36. Some of the caching data structures are organized as linked lists of nodes, each node containing information which describes a portion of the cache data stored in the cache memory 24, in accordance with the principles of the present invention.

The system as thus described with reference to FIG. 1 is intended to illustrate only those aspects of the storage controller which pertain to the present invention. Hence, some functions are omitted and others simplified to a level appropriate to a discussion of the present invention. Nor is the scope of the invention limited by the particular features of the illustrated system. The principles of the present invention may be applicable to other digital computer systems having linked list data structures in memory and devices or agents for sorting the elements contained in such linked list data structures.

Figure 2:
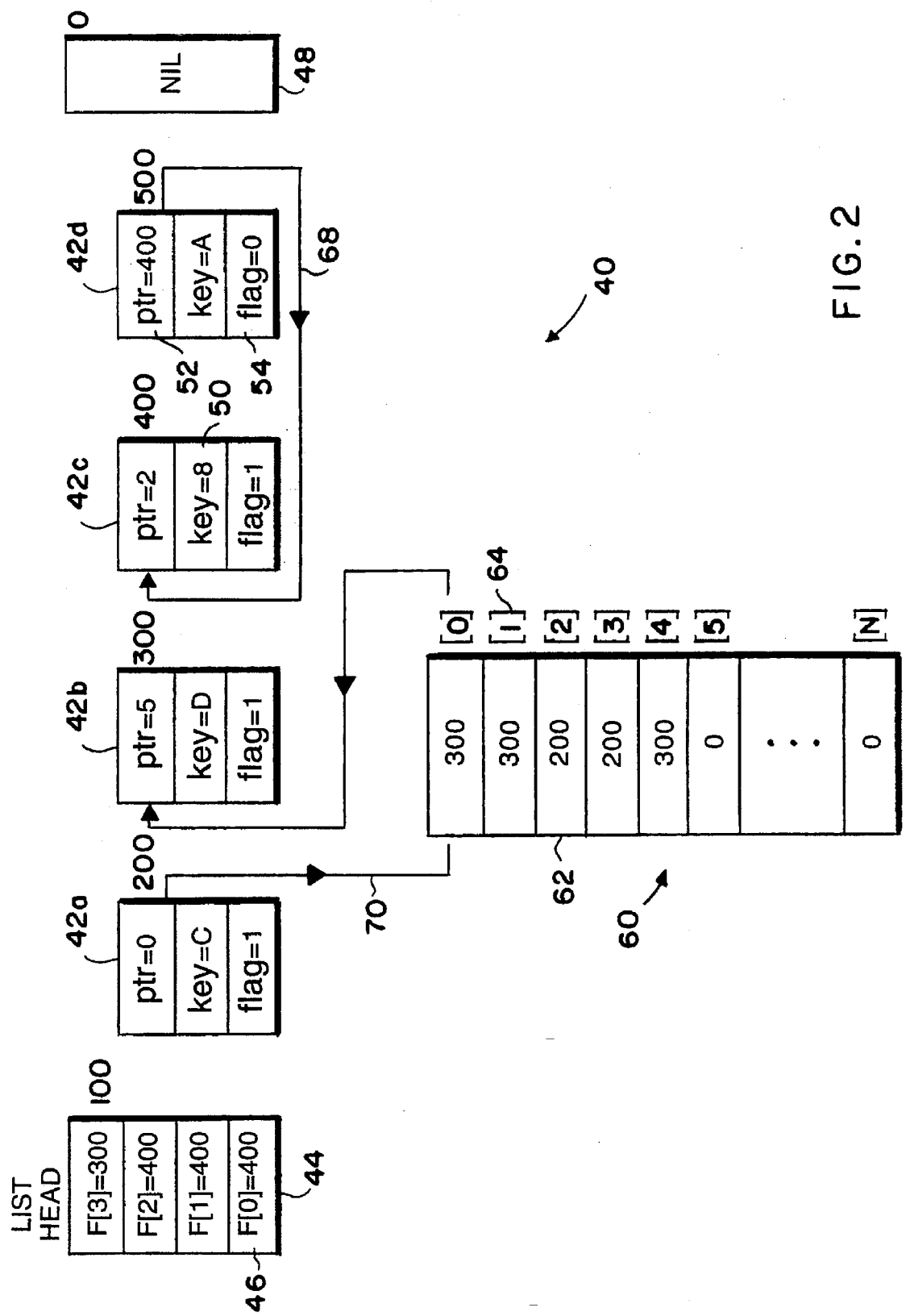
FIG. 2 is an illustration of a sorted, linked list of data elements according to the principles of the present invention.

FIG. 2 illustrates an example of a singly linked list of data elements sorted in accordance with the principles of the present invention. Referring to FIG. 2, the linked list data structure 40 is a skip list having four data elements or "nodes" 42a–d. Although the example depicts a four-level list having four nodes, the invention is not so limited. A list head 44 points to the list and has a pointer 46 at each of the levels, indexed "0" to "3" as shown. Each indexed pointer 46 is an address of the next element at that index or level. For example, the level 2 (F[2]) pointer 46 is the pointer to the next element, element 42c (at an address location corresponding to "400"), at level 2. The end of the list is indicated by a stored null or "NIL" value 48. This null value may point to a dedicated "NIL" node, which serves to terminate the list and is distinguished by having a key which is greater than any possible real key. Alternatively, a null pointer "NULLPTR" (value=0) may be used in a particular node to indicate that the next node is, in that given instance, the NIL node. Consequently, the algorithm must check the pointer in each node to determine if it is the NULLPTR and, if it is, take appropriate measures "as though" the next node has a key greater than the search key.

Typically, and as shown in FIG. 2, each element or node 42a–d has an identifying key 50 and an element pointer 52 for locating the next element in the list. The key 50 is assigned prior to the commencement of the sorting procedure. To sort the elements by key value in a desired order, such as an ascending order as shown in the figure, the elements themselves need not be moved. Rather, the element pointer values are changed to point to different elements. Such a singly linked list is well suited to operations, such as an insertion sort, which move through the list from front to back, since the singly-linked list can only be traversed in a forward direction. If a skip list data structure is utilized to increase the speed of the search of the already sorted list to find the insertion location for the element to be inserted, additional pointers need to be added to certain elements or nodes based on the level assigned to that element at insertion time.

Normally, each node of a skip list contains one or more pointers (or pointer arrays), each pointer corresponding to a different level or index and linking the node to a successor node. At least one of those pointers allocated to each node points to an "immediate" successor node, which is the successor node immediately adjacent to such node and corresponds to the lowest index. Typically, each node must have room to accommodate a maximum number of pointers, and does, in fact, store a number of pointers determined probabilistically at insertion time.

Thus, to implement a "skip list" insertion sort for a singly-linked list of nodes according to the present invention, each node is provided with a flag bit 54, the function of which will be discussed later. Further, a small amount of memory is reserved for maintaining extra pointer arrays, to be used by those elements or nodes having a node level greater than level 0 in the skip list. Thus, an array of pointer arrays 60 including a plurality of pointer arrays 62 is provided. Preferably, the entire array 62 is treated like a stack, when a pointer array is allocated, only the exact number of pointers from the stack required for the indicated level (level+1 pointers) are consumed. Alternately, the pointer arrays could be of fixed size.

Still referring to FIG. 2, each pointer array (or pointer, a pointer array with one pointer) 62 has an associated index 64. Thus, the entire array of pointer arrays 60 is indexed from 0 to some integer N. If a new element uses a pointer array 62 in the array of pointer arrays 60, the index 64 for that pointer array is stored in the field of the element pointer 52. Thus, the flag bit 54 is used to indicate that the element pointer field contains a pointer array index. It should also be noted that the present invention need not be limited to a separate flag bit as thus described. For example, it may be possible to encode the flag into the value in another field, such as the element pointer field. Such an alternative embodiment may be desirable or even necessary, particularly if the required space in each element for storing a separate flag bit is not available. It is also important to note that, in utilizing a skip list in sorting a singly linked list, the list head (distinct from the list head of the unsorted list, which points to the first element in the unordered list) is initialized prior to the sort procedure so that all of its pointers—the pointers at levels 0 through 3 in FIG. 2—point to NIL 48.

Accordingly, and with respect to the preferred embodiment of the present invention, an additional array of flag bits and an array of pointer arrays are added to the array of element pointers and array of keys in the list. Consequently, an available pointer array is allocated for an element being inserted and its associated flag bit is set (TRUE) when the level of the element is greater than level 0. If a pointer array is unavailable, the node level is forced to zero. In the preferred embodiment shown in FIG. 2, the key, the element pointer and the flag bit associated with a given node are contained within a single node structure. Alternatively, these items could be stored in separate arrays.

For the most part, the actual pointer links have been omitted in FIG. 2 to avoid confusing the illustration. However, two links are shown to illustrate important aspects of the invention. One link, labelled "68", provides an example of a flag=0 condition. The other link, labelled "70", illustrates an example of a flag=1 condition. A flag bit equal to zero in element 42d indicates that element 42d has been inserted into the sorted (ordered) list at a level 0. Thus, the element pointer 52 is the address of the next element. As expected, the address value ("400") belongs to that of element 42c, since element 42c has the lowest key value that is greater than that of element 42d. Therefore, link 68 points directly to element 42c, as element 42d is at level 0 and element 42c qualifies as the next element in terms of ascending order. In contrast, element 42a has been inserted at a level greater than zero, as indicated by its "TRUE" flag setting. Unlike element 42d, this element has additional pointers. As previously described, the pointer allocation for such an element containing extra pointers is accomplished by indexing a pointer array 62 in the array of pointer arrays 60. In this example, link 70 shows element 42a in reference to the next element in the ordered list. Element 42a thus points to the pointer array 62 that corresponds to index "0". This pointer array provides the address value "300" of the next element in the ordered list. The pointer array contains the additional pointers as well.

To fully appreciate the application of skip list structures and optimized search techniques in achieving an "in-place" sort with an execution speed of the order n*log(n), it is helpful to visualize the sorted list as a skip list through the use of a basic skip list representation which shows the pointer links and levels more clearly. Thus, to more closely relate the skip list structure to the sorted list in FIG. 2, a more generic (or abstract) representation of that sorted list as a skip list is provided in FIG. 3.

Figure 3:
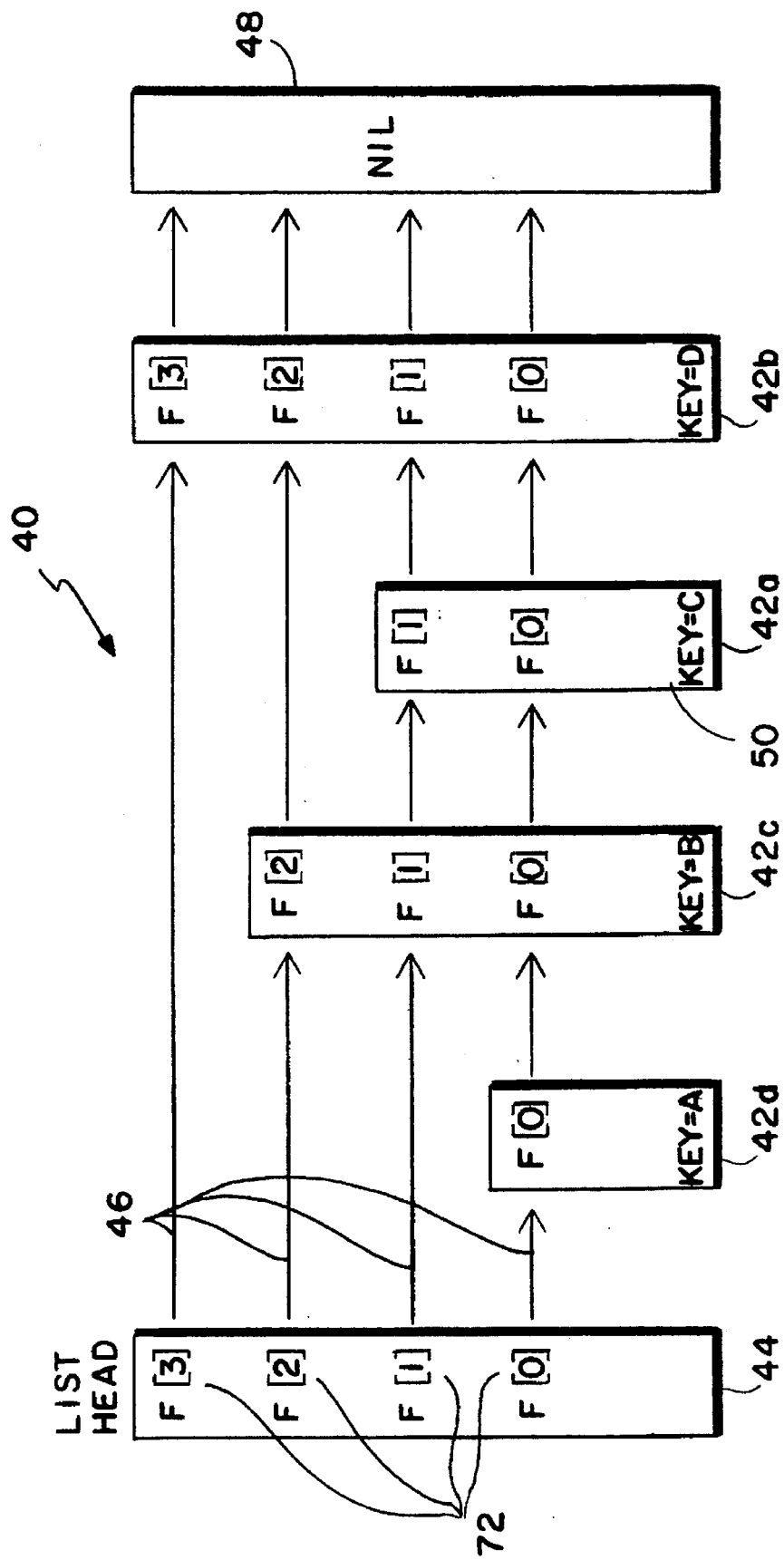
FIG. 3 is an alternative representation of the sorted, linked list shown in FIG. 2.

Referring to FIG. 3, the skip list data structure 40 has the same list head 44, null or NIL value 48 and four data elements or nodes 42a–d shown in FIG. 2. The list head 44 points to the list of elements with the pointers 46 (shown in FIGS. 2-3 as F[0], F[1], F[2], F[3], and also indicated by "links" in FIG. 3), indexed lowest to a maximum number 72, the index thus indicating the level within the list of a given one of the pointers 46. In the example shown, the lowest index is "0" and the maximum index is "3". The maximum index corresponds to the maximum level or maximum allowable list level. Since pointers at all of the levels (up to the maximum allowed level) are being used, the "current" level of the list is the same as the maximum level.

Each node shown in both FIGS. 2 and 3 is allocated one or more of the pointers 46 (i.e., pointers F[0], F[1], F[2], and F[3]), each linking that node or element to a successor (next) node. Although each pointer 46 is an address, note that the reference 46 is being used to refer generally to forward pointers at given pointer levels, not specifically to the corresponding addresses. For example, it is clear from the figure that the level 2 pointer (F[2]) in node 42c is not the same address as F[2] in the list head 44 or node 42b. The allocated one or more pointers 46 in a given node thus comprises the pointer array for the node. At least one of the pointers allocated to each node, F[0], points to an "immediate" successor node, which is the successor node immediately adjacent to such node, and corresponds to the lowest index. The number of pointers allocated to any given node is determined probabilistically at insertion time. The level associated with each of the nodes 42a–d is related to the number of pointers allocated to and used by that node. Each of the pointers in a given node links such node to a next node of node level at least as great as the index of that pointer. Being so linked, that next node thus becomes a successor node with respect to the given node. If the pointers in a node are indexed from 0 to some integer i and every node has a level 0 forward pointer, then the level is equal to the number of extra pointers allocated to the node. The number of pointers required in the pointer array for this invention for an infinite number of levels is the maximum number of elements times (*) 0.58333 (7/12) assuming b=4.

In accordance with the present invention and as discussed with reference to FIG. 2, the pointer arrays for each node containing extra pointers are obtained from a particular pointer array 62 in the array of pointer arrays 60 shown in FIG. 2 according to the index specified by the element pointer. Thus, the singly linked list retains its "singly-linked" character even while a skip list insertion sort is being performed. Each node 42a–d in FIGS. 2 and 3 contains one element pointer, which will be a pointer array of one pointer pointing to the immediate successor node when the node level is 0, but will index into the array of pointer arrays when the level is greater than zero. Once the list is sorted, there is no further need to reference the array. At this point, the only address of concern is that of the immediate successor node. Therefore, the element pointers in the nodes at node levels greater than zero—in FIGS. 2 and 3, these nodes include nodes 42b–d—are adjusted to point to the immediate successor node. The addresses shown in the pointer arrays indexed by these nodes in FIG. 2 are the addresses which will be copied to the element pointers for those nodes.

Hence, FIG. 3 clearly illustrates the effectiveness of skip lists in reducing the number of comparisons required during an insertion search operation, which is performed for each list element during an insertion sort. Reference may be had to the article by William Pugh, entitled "Skip Lists: A Probabilistic Alternative to Balanced Trees", Communications of the ACM. June 1990, pp. 668–676, for further information on basic skip list data structures and related algorithms.

Figure 4:
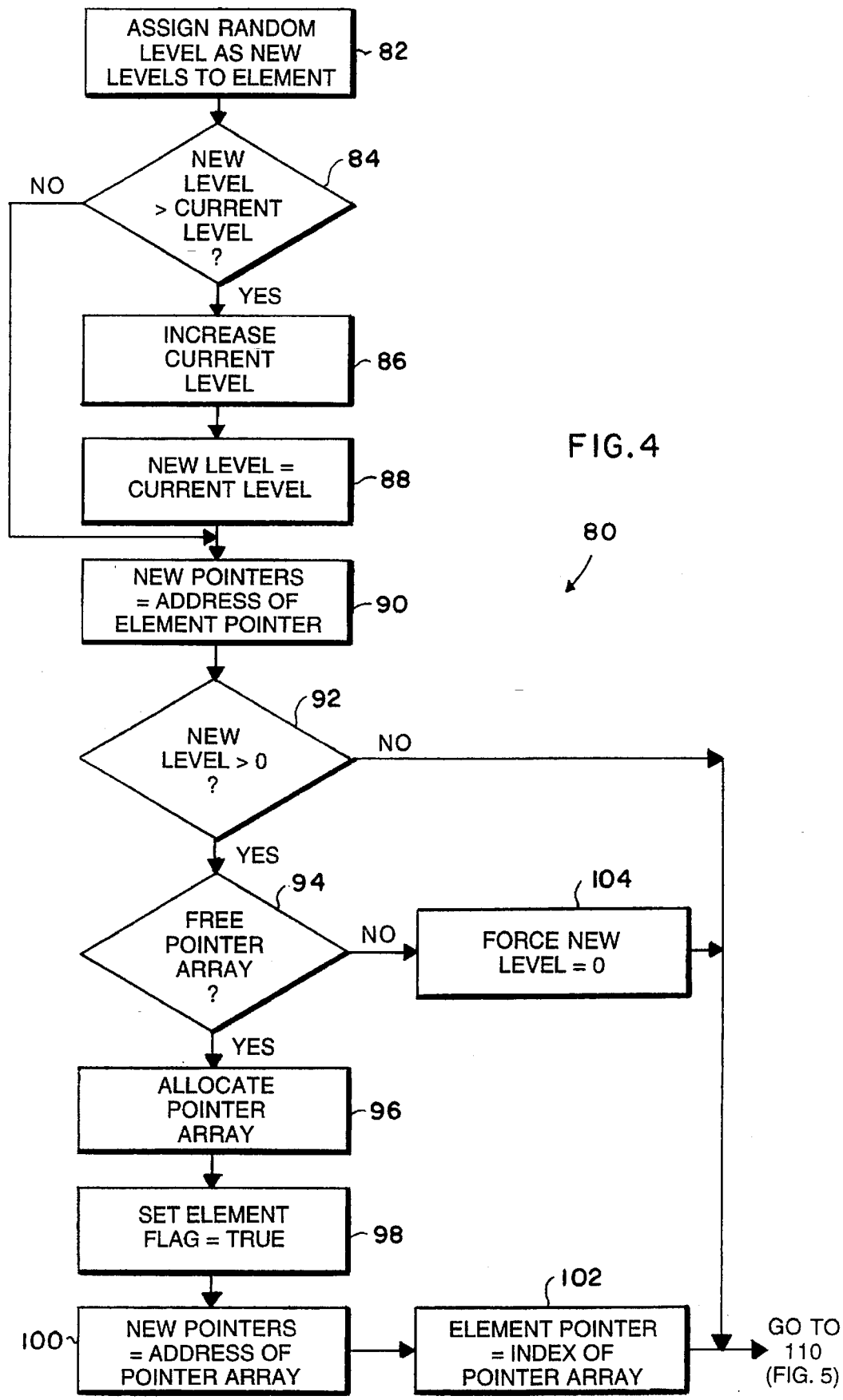
FIGS. 4 and 5 are flowcharts which illustrate collectively the insertion of one element during an insertion sort performed on a singly linked list according to the principles of the present invention.
Figure 5:
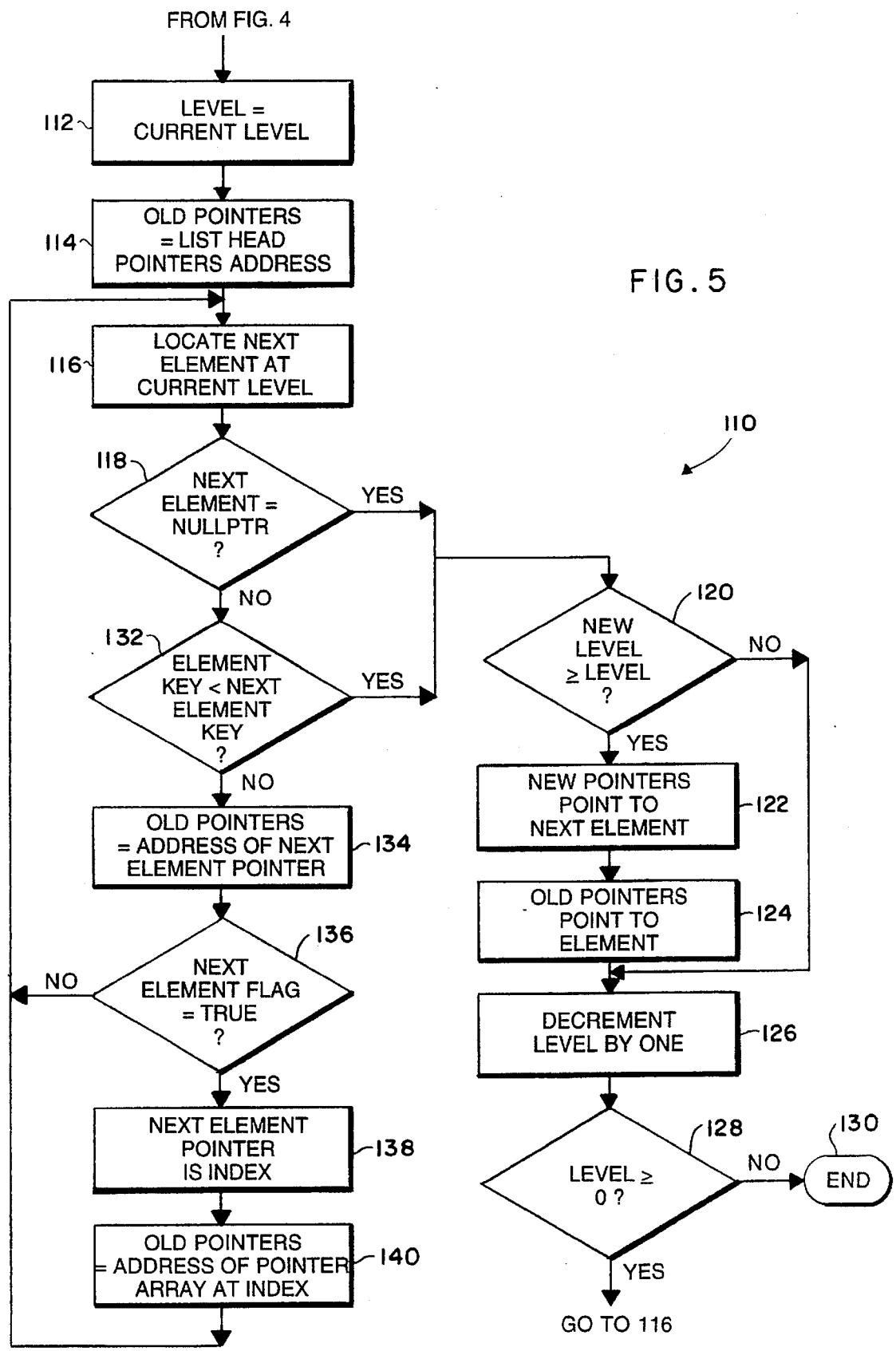

A preferred method of inserting an element during a skip list insertion sort according to the present invention is illustrated in the collective flowcharts of FIGS. 4 and 5. Prior to searching the sorted list for the appropriate insertion location where the element being sorted will be inserted, the element must be prepared for insertion into the sorted list. FIG. 4 depicts those preparatory steps performed prior to initiation of an insertion search. FIG. 5 illustrates the details of the insertion search operation.

With reference to the flowchart shown in FIG. 4, the insertion search preparation 80 requires that a new level be assigned to an element being inserted (also referred to as the test element or, simply, the element) in the "sorted" portion of the list (i.e., the skip list) 82. Again, the new level is assigned probabilistically and cannot exceed the maximum level allowed by the implementation. The new level is then compared to the current level of the list to determine if the new level is greater than the current level 84. If the new level is greater than the current level (and the current level is less than the maximum allowable levels), the current level is increased 86 and the new level is made the same as the current level 88. At either this point or at such time as the new level is determined not to be greater than the current level (in response to step 84), the "new pointers" for the element are defined as corresponding to the address of the element pointer of that element 90.

Next, a determination is made as to whether or not the assigned node level is greater than zero 92. If it is greater than zero, a check is made to determine pointer array availability 94. If a free pointer array is available, it is allocated for use by the element 96. Given the allocation of an available pointer array to the element, the flag bit is set (logic "1" or TRUE) 98 and the element is inserted in the skip list using the allocated pointer array. This is accomplished by making "new pointers" the address of the pointer array 100 and storing the index of the allocated pointer array in the element pointer field of the element 102. Thus, the element pointer is used to index into the array of pointer arrays to obtain an address of the pointer array corresponding to the stored index. Now that the pointers have been allocated and a level assigned to the element, the insertion search 110 can begin. If the new level is not found to be greater than zero in step 92, the "new pointers" will point to the element pointer field and the procedure will go directly to the insertion search 110. If the new level is greater than zero according to step 92 and the pointer array availability determination of step 94 indicates that a pointer array is not available for use by the new element, the new level is forced to zero 104 and the insertion search 110 is then executed.

Referring now to FIG. 5, the insertion search 110 is shown in detail. The forward search of the skip list (list of sorted elements) begins at a level equal to the current level 112, by following the "old pointers" or predecessor node pointers at the current level, beginning with the pointers in the list head 114, to find the next element at the current pointer level 116. If the next element is determined to be the NIL node 118, the search at that level terminates (as the NIL value is implicitly greater than all keys) with the performance of several additional steps. First, a>=comparison of the levels is made 120. If the new level is greater than or equal to the current level, pointers are updated in steps 122 and 124. The pointer in "new pointers" indexed by the current search level is changed to point to the next element 122 and the pointer in "old pointers" indexed by the current search level is changed to point to the element 124. At this stage or if the new level is determined to be less than the level in step 120, the search level is decremented by one 126. Once the search level is decremented, it is compared to zero using a>=comparison function 128. As long as the search level is greater than or equal to zero, the search loop will repeat—starting again at step 116. When an insertion search at all levels (including level zero) has been completed, this insertion ends 130, as the element has been inserted into the ordered list. Once all elements have been sorted, the list can be traversed to set the node level of every element to zero, and adjust the element pointer if necessary, so that the temporary storage containing the pointer arrays may be reused. It should be noted that the node level is never recorded. Rather, it is implicit in the actual pointers being used for a given node.

Returning now to step 118, if the next element is not the NIL node, then the algorithm checks to see if the key of the element is less than the key of the next element 132. If the element has a smaller key value, then step 120 as described above is executed. If the element key is not less that the next element key, the search continues at that level. Consequently, the address of the (new) next element ("old pointers") is obtained from the next element pointer 134. To ascertain whether the next element pointer is the actual pointer array or the index of the pointer array in the array of pointer arrays, the next element flag bit is tested for a TRUE condition 136. If it is not set (i.e., the level is zero), the algorithm performs step 116 next, since the pointer array actually occupies the next element pointer field as the next element pointer, and, therefore, the next element pointer points to a pointer array location without indexing into the array of pointer arrays. A TRUE next element flag indicates, then, that the next element pointer field contains the index 138. Thus, the "old pointers" correspond to the address of the pointer array at that index 140. Having ascertained the pointer array address, the (new) next element can be located according to step 116.

FIG. 6 provides an example of a pseudo-code implementation of the insert process depicted collectively in the flowcharts of FIGS. 4 and 5. Accordingly, a first portion of the code labeled 80 corresponds to method 80 (from FIG. 4) and the remaining or second portion labeled 110 corresponds to method 110 (from FIG. 5).

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. A digital computer system comprising:

a memory;

a data structure stored in the memory, the data structure including an unsorted singly linked list of elements, each of the elements having a key being assigned prior to an insertion sort operation;

an array of pointer arrays, each pointer array of the array of pointer arrays having an associated index;

a flag corresponding to each element, the flag being initialized to zero, the flag for indicating whether the corresponding element has a level greater than zero;

a list head having a maximum allowable number of levels and a pointer at each of the levels, the pointer for pointing to a one of the elements inserted at a level equal to the pointer level during the insertion sort operation, the pointer being initialized to point to a NULLPTR prior to the insertion sort operation;

an array of element pointer fields, each element pointer field in the array storing an element pointer corresponding to a separate element, each element pointer field storing as the element pointer one of said indices when the flag indicates a level greater than zero and a pointer array when the flag indicates a level not greater than zero; and a system agent for performing the skip list insertion sorting operation on the unsorted singly linked list, the system agent checking the flag during linking to determine whether the pointer array for a given element is located in the array of pointer arrays if set or in the element pointer field if not set.

2. A digital computer system according to claim 1, wherein each of the flags, keys and element pointer fields corresponding to the same one of the elements are contained in a single structure.

3. A digital computer system according to claim 1, wherein each pointer array is treated as a stack.

4. A method of inserting an element in a linked list of elements, each element having an element pointer field for storing an element pointer and having an assigned key, the linked list being pointed to by a list head including a maximum allowed number of pointers, the pointers indexed from a lowest to a maximum number, the index corresponding to a level, the linked list having a current level no greater than the maximum allowed number of pointers, comprising the steps of:

assigning a randomly generated level as a new level to the element;

comparing the new level to the current level to determine if the new level is greater than the current level;

if the new level is greater than the current level, the current level is increased such that the new level is the same as the current level;

determining if the assigned new level is greater than zero;

if the new level is greater than zero, the performing the steps including:
determining if a pointer array in an array of pointer arrays is available;
if a pointer array is not available, forcing the new level to zero;
if a pointer array is available, allocating the available pointer array for use by the element;
setting a flag bit in the element in response to the allocating of a pointer array to indicate that a pointer array is allocated to the element;
storing an associated index of the allocated pointer array in the element pointer field of the element, thereby enabling the element pointer in the element pointer field to index into the array of pointer arrays to obtain an address of the pointer array; and
performing an insertion search.

5. A method of inserting an element in a linked list of elements according to claim 4, wherein the step of performing an insertion search comprises:

at a search level equal to the current level, searching by following predecessor pointers to find the next element at the current level;

if the next element is the NIL node, terminating the search at the search level by executing the steps including:
performing a greater than or equal to comparison of the levels;
if the new level is greater than or equal to the search level, then update the pointer array to point to the next element and update the predecessor pointer indexed by the current search level to point to the element;
next, or if the new level is determined to be less than the level, the search level is decremented by one;
comparing the decremented search level to zero using a greater than or equal to comparison function;
if the search level is greater than or equal to zero, then repeating the step of searching until a search at all levels has been completed;

if the next element is not the NIL node, then determine if the key of the element is less than the key of the next element;

if the element is determined to have a smaller key than the next element, then execute the step of terminating the search;

if the element key is not less that the key of the next element, then continue searching at the search level by executing the steps including;
obtaining the address of a new next element from the predecessor pointers contained in the next element pointer by testing a flag bit in the next element to determine whether the element pointer of the next element is a pointer array or an index of the pointer array in the array of pointer arrays;
if the flag bit is not set, then finding the new next element by following the next element pointer; and
if the flag bit is set, indexing into the array of pointer arrays to obtain the address for locating the new next element.

* * * * *